United States Patent
Borghi et al.

[11] Patent Number: 5,298,552
[45] Date of Patent: Mar. 29, 1994

[54] WATER BASED ADHESIVE COMPOSITIONS AND PRIMERS FOR POLYOLEFINS

[75] Inventors: Angelo Borghi, Varese; Vincenzo Giannella, Milan, both of Italy

[73] Assignee: Himont Incorporated, Wilmington, Del.

[21] Appl. No.: 856,789

[22] Filed: Mar. 24, 1992

[30] Foreign Application Priority Data

Mar. 27, 1991 [IT] Italy .................. 91 A 000815

[51] Int. Cl.$^5$ .................. C08L 27/24; C08L 31/04
[52] U.S. Cl. .................. 524/519; 524/522; 524/524
[58] Field of Search .................. 524/524, 522, 475, 519

[56] References Cited

U.S. PATENT DOCUMENTS

| | | | |
|---|---|---|---|
| 3,558,542 | 1/1971 | McDonald | 524/524 |
| 4,741,860 | 3/1988 | Hartman | 524/524 |
| 4,981,730 | 1/1991 | Zaleski | 524/523 |

FOREIGN PATENT DOCUMENTS

| | | | |
|---|---|---|---|
| 0207475 | 9/1986 | Japan | 524/524 |
| 1-256549 | 8/1989 | Japan . | |

OTHER PUBLICATIONS

JP-A-59 004 637 (Mitsubishi Petrochem K.K.) Jan. 11, 1984–Abstract.
JP-A-62 001 589 (Ricoh K.K.) Jan. 7, 1987–Abstract.

*Primary Examiner*—Paul R. Michl
*Assistant Examiner*—Peter Szekely

[57] ABSTRACT

Predominantly water based adhesive compositions and primers comprising:
A) 2 to 50 parts by weight of a solution in a non-ionic surface active agent of one or more chlorinated polyolefins;
B) 50 to 98 parts by weight of a component selected from:
  1) an aqueous dispersion comprising from 35 to 65 part per hundred by weight of vinylacetate-ethylene copolymer and
  2) an aqueous solution comprising from 0.1 to 5% by weight of an anionic surface-active agent.

4 Claims, No Drawings

WATER BASED ADHESIVE COMPOSITIONS AND PRIMERS FOR POLYOLEFINS

The present invention relates to water based adhesive compositions and primers for polyolefins.

Many industrial applications of polyolefin materials in film or sheet form require the bonding of said materials to others, in some cases having a different chemical nature, and this is done by using adhesives and, in some cases, primers.

The adhesive formulations presently known are generally made up of polymer solutions in organic solvents, or aqueous emulsions containing said polymers together with a considerable quantity of aromatic and/or chlorinated solvents. Examples of such adhesive formulations for polyolefins presently available in the market include, for example, chlorinated polyolefins produced by Eastman Chemicals and sold under the CP-343-1, CP-343-3 and CP-515-2 trademarks.

Due to environmental, work and safety reasons, however, there is a need for water based adhesive compositions and primers, i.e. adhesive compositions and primers containing very reduced quantities of aromatic and/or chlorinated organic solvents.

The use of water based adhesive compositions and primers for polymers other than polyolefins is already known. For example, in order to bond polyvinylchloride sheets to cardboard, the paper and cardboard industry presently uses adhesive compositions based on of aqueous dispersions of vinyl acetate-ethylene copolymers. One example of such adhesive compositions is the product sold by Montedipe S.p.A. under the Vinavil EVA 015 trademark.

It has been found by the Applicant that predominantly water based compositions comprising a solution of chlorinated polyolefins in non-ionic surface-active agents, can be used advantageously, depending on their formulations, to cause the polyolefins to adhere to water-absorbent materials, or promote the adhesion of polyolefins to water-repellent materials.

SUMMARY OF THE INVENTION

Object of the present invention are, compositions useful as adhesives and primers comprising;
  A) from 2 to 50 parts by weight of a solution, in a non-ionic surface-active agent of one or more chlorinated polyolefins comprising from 5-25% chlorine by weight, and having a number average molecular weight from 5,000 to 50,000;
  B) 50 to 98 parts by weight of a component selected from:
    1) an aqueous dispersion comprising from 35 to 65 parts per hundred by weight of a vinylacetate-ethylene copolymer, wherein the ethylene constitutes from 25 to 35% of the polymer by weight, preferably about 30%, and
    2) an aqueous solution comprising from 0.1 to 5% by weight of an anionic surface-active agent.

DETAILED DESCRIPTION

By aqueous dispersion is intended a 2-phase system comprising one solid and one aqueous phase, where the solid phase comprises particles (generally colloidal in nature) substantially uniformly distributed in the aqueous phase.

In the case where dispersion 1) above is selected as component (B), such compositions are useful as adhesives for joining polyolefin films or sheets to water-absorbent maerials, such as paper, carboard, wood, leather and hides.

In the case where solution 2) above is selected as component (B), such compositions are useful to promote the adhesion of polyolefins to water-repellent materials, such as the polyolefins themselves, in various forms including film, sheet, fibers or foam, as well as other polymer materials or metals; the application of such compositions on the surface of a polyolefin is also useful as a pretreatment to improve the adhesion of subsequently applied paints.

For the purposes of the present invention by the term "primers" is meant those substances which, when used alone, do not possess sufficient adhesive properties to the surface on which they are applied, and therefore they need the addition of an adhesive agent. The compositions of the present invention, besides having the advantage of reducing environmental and work safety problems, also display better adhesive properties compared to the adhesive formulations known in the art.

Examples of polyolefins where the adhesive compositions and primers of the present invention can be used include: polymers and copolymers, or their mixtures obtained by way of sequential polymerization of one or more $R''-CH=CH_2$ olefins, where $R''$ is a hydrogen atom, or a 1-6 C alkyl, or an aryl radical, in particular phenyl. Particularly, said polymers and copolymers include:

I) isotactic, or substantially isotactic, polypropylene;

II) polyethylene including high density (HDPE), low density (LDPE) and linear low density (LLDPE);

III) crystalline copolymers of propylene with ethylene and/or other linear or branched $C_4-C_{10}$ α-olefins, such as for example 1-butene, 1-hexene, 1-octene, 4-methyl-1-pentene;

IV) elastomeric ethylene/α-olefins copolymers and ethylene/α-olefin/diene terpolymers containing minor proportions of diene, wherein the α-olefin is preferably selected from the group consisting of propylene, 1-butene, 1-pentene, 1-hexene, 4-methyl-1-pentene, 3-methyl-1-butene; examples of useful dienes include butadiene, ethylidene-norbornene and 1-4 hexadiene);

V) heterophasic polymers and copolymers obtained by sequential polymerization, wherein the phases comprise (a) a homopolymer fraction of a polymer of propylene, or one of the copolymers identified in (III) above, and (b) a copolymer fraction comprising the elastomeric copolymers identified in (IV).

Examples of chlorinated polyolefins which are useful as component (A) include chlorinated polypropylene, polyethylene, polyisobutylene and ethylene-propylene copolymers, optionally containing carboxyl groups; for example the chlorinated polypropylenes marketed by Eastman Chemicals under the CP-343-1, CP-343-3 and CP 515-2 trademarks. A preferred polyolefin of this type is CP-343-1.

Examples of non-ionic surface-active agents include alkylaromatic compounds comprising one or more linear alkyl chains and having a number of alkyl carbons from 9 to 24. Specific examples of such surface-active agents are nonylbenzene, n-dodecylbenzene, tridecylbenzene (1-phenyltridecane), and di-(n-dodecylbenzene); preferred is n-dodecylbenzene.

The concentration of chlorinated polyolefin in solution (A) depends on the specific polyolefin and the type of surface-active agent employed. Generally, it is preferable to operate at the maximum concentration of chlorinated polyolefin, i.e. that concentration that when exceeded does not allow one to obtain a clear solution stable over time. In particular, when the chlorinated polyolefin is CP-343-1 and the surface-active agent is n-dodecylbenzene, the maximum concentration of chlorinated polyolefin, which still results in a solution which is permanently clear, is 20 parts by weight of polyolefin in 80 parts by weight of surface-active agent.

More generally, the concentration of chlorinated polyolefin which can be used in solutions (A) is from 5 to 25% by weight.

Examples of anionic surface-active agents useful in solution component (B,2) are sulfonic acid salts, such as alkyl sulfonates and alkylbenzene sulfonates. Specific examples include dioctylbenzene sulfosuccinate, sodium lauryl sulfate, sodium sulforicinate, and dodecylbenzenesulfonate. Preferred is dioctylbenzene sulfosuccinate.

In order to obtain the best adhesive result, the surfaces to be bonded are appropriately subjected to a preliminary cleaning treatment. One such cleaning treatment may consist, for example, of degreasing with a chlorinated solvent, such as 1,1,1-trichloroethylene, at ambient temperature.

The following examples are given to illustrate and not limit the present invention.

EXAMPLES

GENERAL OPERATING METHODS

The adhesion tests are carried out according to the procedure described below.

The water-absorbent material used is cardboard for cardboard industry with a weight in grams equal to 1450 g/m$^2$ and 2.5 mm thick.

The adhesive composition is spread on the cardboard with a spatula in a quantity which varies from 1 to 10 g of solid residue/m$^2$. The coated surface is allowed to dry for 2 minutes and 15 cm×3 cm strips of polyolefin film are then applied using a pressure of about 50 g/cm$^2$ The pressure is maintained at this level for one hour at ambient temperature.

The adhesion test is carried out at least 24 hours after the above sample preparation.

The adhesion test (manual peeling test) indentifies three levels of adhesion:
  good ("B") if the delamination occurs in the body of the cardboard,
  bad ("C") if the delamination occurs in the interface between cardboard and polyolefin sheet,
  partial ("P") if the delamination occurs partially in the body of the cardboard and partially in the interface between cardboard and polyolefin sheet.

In conducting the peeling tests, four types of polyolefins sheet are prepared. They are all obtained by calendering at 190° C., starting with a partially crystalline copolymer consisting of about 60% propylene and 40% ethylene, having a melt flow rate (MFR)=1 g/10 minutes (at 230° C. and under a weight of 2.16 kg).

These sheets are described in details herebelow and are identified with the numbers 1 to 4.

Polyolefin sheet 1: black pigmented, 150 μm thick, surface tension<38 dyne/cm.

Polyolefin sheet 2: black pigmented, flame treated, 150 μm thick, surface tension 43 dyne/cm.

Polyolefin sheet 3: white pigmented, 150 μm, surface tension <38 dyne/cm and having the following formulation: 50 parts by weight of the polymer described above, 20 parts by weight of mineral oil marketed by ROL under the trademark OB 55 (having a high content of paraffin carbon and no aromatic carbon) and 30 parts by weight of calcium carbonate.

Polyolefin sheet 4: white pigmented, same formulation as preceding product, flame treated, 150 μm thick and surface tension<38 dyne/cm.

EXAMPLE 1

An aqueous dispersion is prepared at 50% by weight of 70-30 vinyl acetate-ethylene copolymer, i.e. containing 70% by weight of vinyl acetate and 30% by weight of ethylene.

A solution of CP-343-1 chlorinated polyolefin, marketed by Eastman Chemicals (containing about 15% by weight of chlorine and having a number average molecular weight of about 15,000) is prepared at 20% by weight in non-ionic surface-active agent n-dodecylbenzene. Said solution is mixed in different percentages to the aqueous dispersion of the vinyl acetate-ethylene copolymer previously prepared in order to obtain the adhesive compositions.

In Table 1 are reported the adhesive compositions obtained, as well as their performances in terms of level of adhesion to the cardboard following the operating methods described above.

The results summarized in Table 1 show that the adhesion levels are good for all the polyolefin sheets tested and are apparently independent the surface tension of the polyolefin sheets.

It is also observed that good results are obtained even when the percentages by weight of n-dodecylbenzene and chlorinated polyolefin are very low (2 and 0.5% respectively). This represents an advantage in economic terms.

EXAMPLE 2 (COMPARATIVE)

A solution is prepared at 20% by weight of CP-343-1 chlorinated polyolefin in toluene. Said solution is mixed in different percentages to the aqueous dispersion of the vinyl acetate-ethylene copolymer previously prepared.

In Table 2 are reported the adhesive compositions obtained, as well as their performances in terms of adhesion to the cardboard (Tests 9-11).

EXAMPLE 3 (COMPARATIVE)

The operation is the same as for Example 1, except that a CP-343-1 solution at about 15% in diisopropylbenzene (mixture of the two isomers meta and para) is used instead of the CP-343-1 in n-dodecylbenzene solution.

The result in the adhesion tests is shown in Table 2 (Test 12).

EXAMPLE 4 (COMPARATIVE)

The operation is the same as far Example 1, except that a solution of the chloroparaffin marketed by Società Caffaro under the trademark of Cloroparin S70 (chloroparaffin with an average molecular weight of 1035 and a chlorine titre from 61 to 70%), instead of the chlorinated polyolefin CP-343-1.

The result of the adhesion test is shown in Table 2 (Test 13).

EXAMPLE 5

Aqueous dispersions are prepared of vinyl acetate-ethylene copolymer at 50% by weight of solid, said dispersions containing different percentages by weight of vinyl acetate and ethylene.

Also prepared is a solution of CP-343-1 chlorinated polyolefin as in Example 1. Said solution is mixed in different percentages with the aqueous dispersions of the vinyl acetate-ethylene copolymers in order to obtain the adhesive compositions shown in Table 3.

Table 3 reports the adhesive formulations obtained and their performance in terms of adhesion to the cardboard (Tests 14-23).

Tests 14-19 and 22-23 are comparison tests, while 20 and 21 are carried out according to the present invention.

From the results shown in the Table, it is concluded that the ethylene content in the vinyl acetate-ethylene copolymer is a critical factor to obtain adhesive compositions which perform well.

While in test 23 (comparison) a good level of adhesion was obtained, the same adhesive composition resulted in poor adhesion when bonding the cardboard and a different polyolefin sheet with a lower surface tension (comparative test 22).

EXAMPLE 6

Operating as in Example 1, an adhesive composition is prepared containing 95% by weight of an aqueous dispersion of 70-30 vinyl acetate-ethylene copolymer, 4% by weight of n-dodecylbenzene and 1% by weight of CP 343-1 chlorinated polyolefin.

Said composition is used to bond the polyolefin sheet 1 to materials other than cardboard.

The adhesion level is determined by way of a dynamometer applied to the polyolefin sheet, which measures the maximum strength necessary to obtain the separation of the two materials.

The materials used were beech plywood and gibsum plaster; for both materials the maximum strength necessary to obtain separation was >3N/mm$^2$ (excellent adhesion).

EXAMPLE 7

Operating as in Example 1, an adhesive composition is prepared containing 95% by weight of an aqueous dispersion of vinyl acetate-ethylene copolymer, 4% by weight of n-dodecylbenzene and 1% by weight of CP 343-1 chlorinated polyolefin.

Said composition is used to bond to the cardboard respectively a bioriented polypropylene sheet (homopolymer with a melt index M.I.=5 g/10 minutes, at 230° C. and under a weight of 2.16 Kg.), and a low density polyethylene sheet (LDPE, having a M.I.=3 g/10 minutes, at 190° C. and under a weight of 2.16 Kg and a density of 0.918 g/cm$^3$).

The adhesion level is determined as described in General operating methods and is good ("B") for both adhesion tests.

EXAMPLE 8

A primer for polyolefins is prepared by dissolving the CP-343-1 chlorinated polyolefin in n-dodecylbenzene in a 20:80 weight ratio, and mixing said solution with an aqueous solution at 0.5% by weight of sodium diisooctyl sulfosuccinate, in a weight ratio equal to 25 of CP-343-1 solution and 75 of aqueous solution.

The primer, therefore, has the following composition:

| CP-343-1: | 5% weight |
|---|---|
| n-dodecylbenzene: | 20% weight |
| H$_2$O: | 74.6% weight |

The mixture generates a stable emulsion by simple mechanical stirring.

The two materials to be bonded are an injection molded glass-fiber reinforced polypropylene plaque (containing 30% by weight of glass-fiber) and the polyolefin sheet 1.

The adhesive used is the commercial product marketed by Società Sestriere Vernici S.r.l. under the name "Adesivo Pluribond 1084", which is a bicomponent polyurethane adhesive that develops its adhesive effect when heated at 70°-80° C. for about one minute. The primer is applied on the surfaces of the above mentioned materials. After having been dried in an 80° C. oven, the Pluribond adhesive is applied on one or both surfaces to be bonded.

Operating in accordance with the procedures suggested by the manufacturer, the adhesive is allowed to dry for 10 minutes at ambient temperature, after which it is warmed up to 70° C. for one minute, and then the two plaques are laid one on top of the other and subjected to a pressure of about 800 g/cm$^2$ for 30 seconds, maintaining the heat at 70° C.

Finally the pressure is released and the bonded surfaces are allowed to cool.

The peeling test is carried out 24 hours later.

Resistance to peeling is determined with a simple apparatus which registers the strength at the separation point in N, i.e. the minimum strength necessary to initiate the delamination of a sample 30 mm wide.

With the Pluribond adhesive applied to one surface only, the separation strength is 6.5 N; if it is applied to both surfaces the separation strength is 11.25 N.

EXAMPLE 9

The operation is the same as for Example 8, except that the bonding is done between the polyolefin sheet 1 and an injection molded polypropylene plaque filled with talc (containing 30% talc).

The peeling test shows a separation strength of 7.25 N when the Pluribond adhesive is applied to the talc filled polypropylene only.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spiriti and scope of the invention as described and claimed.

TABLE 1

| TEST No. | | 1 | 2 | 3 | 4 | 5 | 6 | 7 | 8 |
|---|---|---|---|---|---|---|---|---|---|
| n-dodecylbenzene | % by weight | 24 | 24 | 12 | 12 | 2 | 2 | 2 | 2 |
| aqueous dispersion of 70-30 vinyl acetate-ethylene copolymer | % by weight | 70 | 70 | 85 | 85 | 97.5 | 97.5 | 97.5 | 97.5 |
| CP-343-1 | % by weight | 6 | 6 | 3 | 3 | 0.5 | 0.5 | 0.5 | 0.5 |

TABLE 1-continued

| TEST No. | 1 | 2 | 3 | 4 | 5 | 6 | 7 | 8 |
|---|---|---|---|---|---|---|---|---|
| Adhesion Value | | | | | | | | |
| Polyolefin Sheet No. | 1 | 3 | 1 | 3 | 1 | 2 | 3 | 4 |
| Level of Adhesion | B | B | B | B | B | B | B | B |

TABLE 2

| COMPARISON TEST NO. | | 9 | 10 | 11 | 12 | 13 |
|---|---|---|---|---|---|---|
| Toluene | % by weight | 4 | 8 | 16 | — | — |
| Aqueous dispersion of 70-30 vinyl acetate-ethylene copolymer | % by weight | 95 | 90 | 80 | 96.7 | 70 |
| CP-343-1 | % by weight | 1 | 2 | 4 | 0.5 | — |
| Cloparin S70 | % by weight | — | — | — | — | 15 |
| Diisopropylbenzene | % by weight | — | — | — | 2.8 | — |
| n-dodecylbenzene | % by weight | — | — | — | — | 15 |
| ADHESION VALUE | | | | | | |
| Polyolefin Sheet No. | | 1 | 1 | 3 | 3 | 1 |
| Level of Adhesion | | C | C | P | C | C |

TABLE 3

| TEST NO. | | 14 | 15 | 16 | 17 | 18 | 19 | 20 | 21 | 22 | 23 |
|---|---|---|---|---|---|---|---|---|---|---|---|
| Composition of the vinyl acetate/ethylene copolymer | % by weight | 100/0 | 100/0 | 80/20 | 80/20 | 75/25 | 75/25 | 75/25 | 75/25 | 70/30 | 70/30 |
| Aqueous dispersion of vinyl acetate-ethylene copolymer | % by weight | 100 | 85 | 100 | 85 | 100 | 100 | 85 | 85 | 100 | 100 |
| n-dodecylbenzene | % by weight | 0 | 12 | 0 | 12 | 0 | 0 | 12 | 12 | 0 | 0 |
| CP-343-1 | % by weight | 0 | 3 | 0 | 3 | 0 | 0 | 3 | 3 | 0 | 0 |
| ADHESION VALUE | | | | | | | | | | | |
| Polyolefin Sheet No. | | 2 | 2 | 2 | 2 | 1 | 2 | 1 | 2 | 1 | 2 |
| Level of Adhesion | | C | C | C | C | C | P | P | B | C | B |

We claim:

1. A predominantly water based adhesive composition for polyolefins comprising:
   A) 2 to 50 parts by weight of a solution in a non-ionic surface-active agent of one or more chlorinated polyolefins comprising 5-25% chlorine by weight and having a number average molecular weight from 5,000 to 50,000;
   B) 50 to 98 parts by weight of an aqueous dispersion comprising from 35 to 65 parts per hundred by weight of the aqueous dispersion of a vinylacetate-ethylene copolymer, wherein the ethylene constitutes from 25 to 35% of the copolymer by weight.

2. The adhesive composition of claim 1, wherein the vinyl acetate-ethylene copolymer present in component B) has a 30% ethylene content by weight.

3. The adhesive composition of claim 1, wherein the chlorinated polyolefin present in component A) is selected from the group consisting of chlorinated polypropylene, chlorinated polyethylene, chlorinated polyisobutylene and chlorinated ethylene-propylene copolymers, optionally containing carboxyl groups.

4. The adhesive composition of claim 1, wherein the non-ionic surface-active agent present in component A) is selected from the groups consisting of alkylaromatic compounds containing one or more linear alkyl chains, and having a number of alkyl carbons from 9 to 24.

* * * * *

UNITED STATES PATENT AND TRADEMARK OFFICE
CERTIFICATE OF CORRECTION

PATENT NO. : 5,298,552

DATED : March 29, 1994

INVENTOR(S) : Angelo Borghi et al

It is certified that error appears in the above-identified patent and that said Letters Patent is hereby corrected as shown below:

At col. 6, line 10, insert on line below "$H_2O$:  74.6% weight"
    --sodium diisooctyl sulfosuccinate:  0.4 weight %--.

Signed and Sealed this

Twenty-sixth Day of July, 1994

Attest:

BRUCE LEHMAN

*Attesting Officer*    *Commissioner of Patents and Trademarks*